Feb. 9, 1943.  P. W. VAN ORDEN  2,310,819

CONVEYER BELT

Filed June 6, 1941

Inventor
Paul W. Van Orden
By Willis F. Avery
Atty.

Patented Feb. 9, 1943

2,310,819

UNITED STATES PATENT OFFICE 2,310,819

CONVEYER BELT

Paul W. Van Orden, Cuyahoga Falls, Ohio, assignor to The B. F. Goodrich Company, New York, N. Y., a corporation of New York Application June 6, 1941, Serial No. 396,864

3 Claims. (Cl. 198—193)

This invention relates to conveyer belts such as are used for handling ore, coal, rock and similar materials.

Such belts have usually been made of a body of plies of rubberized fabric or longitudinally disposed cords separated by layers of vulcanized rubber composition to provide the necessary strength, and a thick cover of wear-resisting vulcanized rubber on the top and which preferably completely encloses the body.

Where large pieces of rock or other material have been dropped on the conveyer at an angle acute to its plane of travel, considerable force has been applied to the wear-resisting cover, a component of which, in a direction parallel to the belt, has been so great as to cause in some cases local separation of the cover from the body, the surface adhesion of the body to the cover not having been great enough to resist the shear load. Similar forces have at times been applied to conveyer belts where large pieces of rock have become jammed between a horizontal reach of the belt and its supporting frame-work.

The principal objects of this invention are to provide improved security of anchorage between the cover of a belt and its body without materially detracting from the flexibility of the belt, to provide increased cover strength, to provide increased flexibility of the belt, and to provide for economy of materials and convenience of manufacture.

These and other objects will appear from the following description and the accompanying drawing.

Referring to the drawing.

Figure 1:
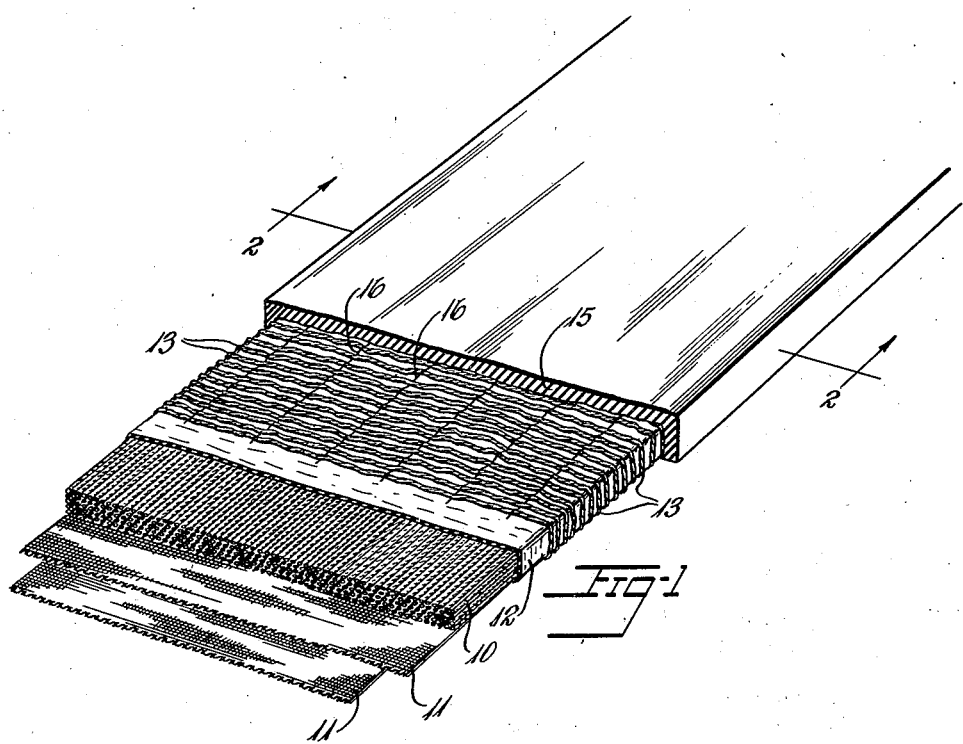
Fig. 1 is a perspective view of a belt constructed in accordance with and embodying the invention, the layers of material of the belt being shown broken away in steps to illustrate its construction.
Figure 2:
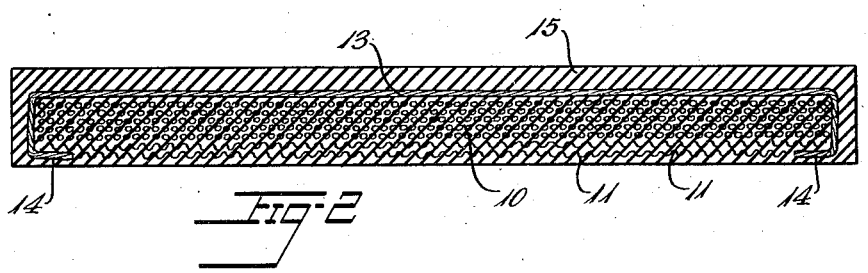
Fig. 2 is a section taken along the line 2—2 of Fig. 1.

Referring to the drawing, in which an embodiment of the invention is illustrated, the belt may comprise any suitable number of layers of woven fabric or other tension-resisting material, but preferably comprises longitudinally disposed cords 10 as shown. Bottom layers 11 of woven fabric may be associated with the cords, if desired.

A layer 12 of rubber-like material is applied over the upper face of the cords 10 and preferably over the side edges. A layer 13 of transversely disposed cords, preferably of great strength, and laid generally at right angles to the margins of the belt, and having their ends anchored, as at 14, around the edges of the belt, are then applied thereto. These cords as well as the cords 10 and fabric 11 may be rubberized so as to facilitate adhesion to the other rubber-like material of the belt body. An outer cover 15 of rubber-like material is applied over the cords and the completed belt is vulcanized under heat and pressure to form a unitary article.

In accordance with the invention I have discovered that improved results may be obtained by disposing the transverse cords 13 in a non-straight manner across the belt, preferably so that these cords assume a wavy disposition, more or less irregular, in each cord reach across the belt, so that the spaces between the cords vary in size. This has the result that the rubber-like material that is forced between the cords 13 during vulcanization, effecting a tie between the cover layer 15 and the layer 12 beneath these cords, varies in cross-section so that occasional relatively thick tying portions are interspersed among relatively thin tying portions.

This construction has been found to offer considerably greater resistance to separation of the cover layer for the same area of adhesion than in the case where the elements of tying rubber are generally of uniform size as is provided by a straight rather than the wavy disposition of the cords. The non-straight or wavy disposition of the transverse cords, especially in association with the weftless longitudinal cords, further, is advantageous in providing increased flexibility of the belt to transverse flexure, which promotes the ability of the belt to conform to curved idlers without objectionable stresses, and good resistance to shock and impact loading is at the same time provided.

When such a belt is subjected to localized forces acting longitudinally of the belt, the transverse cords 13 embedded in the cover resist such forces as tend locally to shift the cover with respect to the body of the belt, the load being distributed over the surface of the belt laterally adjacent to the point of application of the force by the strong cords so that separation of the rubber cover from the textile body of the belt is avoided.

The layer of transverse cords 13 may be weftless, or for the sake of facilitating the handling it may include weak wefts 16 which are subject to rupture after assembly.

The non-straight or wavy disposition of the transverse cords 13 may be effected in any suitable manner, for example by arranging the cords in such disposition during assembly, or by arranging the cords in a generally straight manner and exerting lateral pressure on the belt at the side edges during vulcanization to effect a narrowing of the belt and waviness of the transverse cords, and this action may be assisted by longitudinally tensioning the belt to a degree sufficient to narrow it.

By anchoring the cords around the margins of the belt body, additional security is obtained as the ends of the cords, when vulcanized in position, are substantially immovable, and the load is distributed over the surface of the belt from side to side.

The transverse cords not only impart lateral strength to the belt without detracting objectionably from the flexibility provided by the non-straight disposition, but the cords when deflected act in their tendency to straighten out to snub the force of an article dropped upon the belt tending to shear the cover from the textile body. In the snubbing action, the wavy disposition of the transverse cords has the advantage of reducing the shock load on the cords, because of the necessity of straightening out the cords in the rubber before the full snubbing load is imposed upon them.

Variations may be made without departing from the scope of the invention as it is defined in the following claims.

I claim:

1. A belt comprising a body of stretch-resisting material, and a wear resisting rubber cover vulcanized thereto, said cover having a layer of transversely disposed cord elements embedded in its material-supporting face, the ends of said elements extending around the lateral margins of the belt body and the elements being disposed in a non-straight manner across the belt with the rubber cover material surrounding the elements and disposed between them as tying portions varying in cross-section.

2. A belt comprising a body of stretch-resisting material, and a facing of rubber-like material vulcanized thereto, said facing having a plurality of cords disposed in reaches transversely across the belt, each reach being disposed in a wavy manner and embedded in said facing to resist forces at the belt face tending to drag the facing from the stretch-resisting body.

3. A conveyer belt comprising a body of stretch-resisting cord material, and a facing of rubber-like material vulcanized thereto, said facing having a plurality of cords disposed transversely across the belt in a wavy manner with the rubber-like material surrounding the cords and disposed between them to resist forces at the belt face tending to drag the facing from the stretch-resisting body by shearing stress on the rubber-like material.

PAUL W. VAN ORDEN.